United States Patent
Bolshinsky et al.

(10) Patent No.: US 9,715,490 B2
(45) Date of Patent: Jul. 25, 2017

(54) AUTOMATING MULTILINGUAL INDEXING

(71) Applicant: International Business Machines Corporation, Armonk, NY (US)

(72) Inventors: Leonid Bolshinsky, Karmiel (IL); Sharon Krisher, Haifa (IL); Eitan Shapiro, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/934,250

(22) Filed: Nov. 6, 2015

(65) Prior Publication Data

US 2017/0132204 A1    May 11, 2017

(51) Int. Cl.
   *G06F 17/27*    (2006.01)
   *G06F 17/30*    (2006.01)

(52) U.S. Cl.
   CPC ...... *G06F 17/275* (2013.01); *G06F 17/30619* (2013.01)

(58) Field of Classification Search
   CPC ........ G06F 17/275; G06F 17/20; G06F 17/27; G06F 17/2705; G06F 17/276; G06F 17/28; G06F 17/289
   USPC ..................................... 704/8, 1, 3, 7, 9, 10
   See application file for complete search history.

(56) References Cited

U.S. PATENT DOCUMENTS

| | | | |
|---|---|---|---|
| 8,311,824 B2* | 11/2012 | Lubowich | G10L 15/005 434/156 |
| 8,423,352 B2 | 4/2013 | Lai et al. | |
| 8,788,259 B1 | 7/2014 | Buryak et al. | |
| 8,832,188 B1 | 9/2014 | Cierniak | |
| 8,838,437 B1 | 9/2014 | Buryak et al. | |
| 2009/0170536 A1* | 7/2009 | Rang | G06F 3/0237 455/466 |
| 2013/0297581 A1 | 11/2013 | Ghosh et al. | |
| 2013/0332143 A1* | 12/2013 | Leszczenski | G06F 17/2836 704/2 |

OTHER PUBLICATIONS

Carter et al., "Microblog language identification: overcoming the limitations of short, unedited and idiomatic text", Springer, Lang Resources & Evaluation, 2013, vol. 47, Published online: Jun. 28, 2012, © The Author(s) 2012, pp. 195-215.

* cited by examiner

*Primary Examiner* — Qi Han
(74) *Attorney, Agent, or Firm* — Maeve Carpenter

(57) ABSTRACT

In an approach to automating multilingual indexing, a computer receives text of a conversation between at least two users. The computer detects at least one language associated with the text. The computer determines whether the language associated with the text is detected with a confidence level that exceeds a threshold. The computer retrieves text from one or more previous conversations between the two users. The computer detects at least one language associated with the text. The computer determines whether the at least one language associated with the text is detected with a confidence level that exceeds a pre-defined threshold. The computer analyzes the text using at least one of the detected languages to create one or more terms. The computer indexes the one or more terms and stores a boost value associated with each of the one or more indexed terms corresponding to confidence level of the detected language.

20 Claims, 4 Drawing Sheets

AUTOMATING MULTILINGUAL INDEXING

BACKGROUND OF THE INVENTION

The present invention relates generally to the field of computer search engines, and more particularly to automating multilingual indexing.

An index is an indirect shortcut derived from, and pointing into, a greater volume of values, data, information, or knowledge. The purpose of storing an index is to optimize speed and performance in finding relevant documents for a search query. Without an index, a search engine may scan every document in a corpus, which may require considerable time and computing power. For example, while an index of 10,000 documents can be queried within milliseconds, a sequential scan of every word in 10,000 large documents could take hours. The additional computer storage required to store the index, as well as the considerable increase in the time required for an update to take place, are traded off for the time saved during information retrieval.

If a search engine supports multiple languages, a common initial step during tokenization is to identify each document's language. A search engine uses the language for morphological analysis of search query text. Morphological analysis, as used herein, refers to the analysis of the structure of a given language's morphemes and other linguistic units, such as base forms, root words, affixes, parts of speech, intonations and stresses, or implied context, among others. For example, the same word written with Latin characters can have different base forms in two different European languages, as well as different meanings. The rules for a morphological analysis can be different for every language. Based on the detected languages from morphological analysis, the search engine can correctly find documents that contain words which do not appear in the user's query but have the same base form as the words in the user's query. A base form, as used herein, can refer to the primary lexical unit of a word family.

Language recognition is the process by which a computer program attempts to automatically identify, or categorize, the language of a document. Other names for language recognition include language classification, language analysis, language identification, and language tagging. Automated language recognition is the subject of ongoing research in natural language processing.

SUMMARY

Embodiments of the present invention disclose a method, a computer program product, and a system for automating multilingual indexing. The method may include a computer receiving text of a conversation between a first user and at least one second user. The computer detects at least one language associated with the text. The computer determines whether the at least one language associated with the text is detected with a confidence level that exceeds a pre-defined threshold. Responsive to determining the at least one language associated with the text is not detected with a confidence level that exceeds a pre-defined threshold, the computer retrieves text from one or more previous conversations between the first user and the at least one second user. The computer detects at least one language associated with the text of the one or more previous conversations between the first user and the at least one second user. The computer determines whether the at least one language associated with the text is detected with a confidence level that exceeds a pre-defined threshold. Responsive to determining the at least one language associated with the text is detected with a confidence level that exceeds a pre-defined threshold, the computer analyzes the text using at least one of the one or more detected languages to create one or more terms. The computer indexes the one or more terms. The computer stores a boost value associated with each of the one or more indexed terms corresponding to confidence level of the detected language.

DETAILED DESCRIPTION

In modern computer systems that incorporate search capabilities, it is helpful to correctly determine the language, or set of languages, of content created by a user. Identifying the content language for indexing based on a user's browser or other user interface language setting can be problematic if the user interface setting is in one language and the user creates content in another language. Identifying the content language for indexing based on analysis of the text may not consistently produce good results when the text is short, for example in status updates or posts on a social network. In those instances, the terms in the text may be incomplete or include typographical errors which can make the analysis problematic. Embodiments of the present invention recognize that confidence in language choice for indexing content from social network interactions can be improved by analyzing the language of past communications between participants of a conversation. Implementation of embodiments of the invention may take a variety of forms, and exemplary implementation details are discussed subsequently with reference to the Figures.

Figure 1:
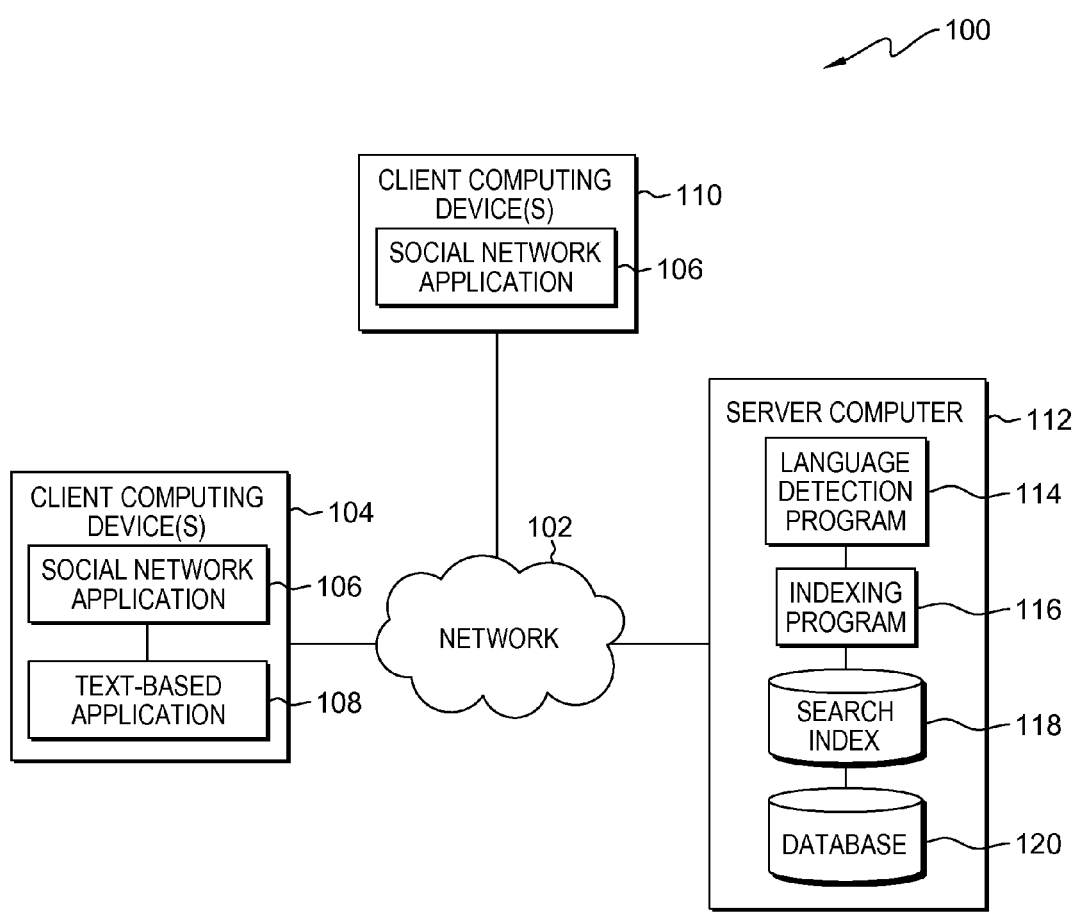
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device(s) 104, client computing device(s) 110, and server computer 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device(s) 104, client computing device(s) 110, server computer 112, and other computing devices (not shown) within distributed data processing environment 100.

Client computing device(s) 104 and client computing device(s) 110 can each be at least one of a laptop computer, a tablet computer, a smart phone, or any programmable electronic device capable of communicating with various components and devices within distributed data processing environment 100, via network 102. Client computing device(s) 104 and client computing device(s) 110 can each be a wearable computer. Wearable computers are miniature electronic devices that may be worn by the bearer under, with or on top of clothing, as well as in glasses, hats, or other accessories. Wearable computers can be especially useful for applications that require more complex computational support than just hardware coded logics. In general, client computing device(s) 104 and client computing device(s) 110 represent any programmable electronic device or combination of programmable electronic devices capable of executing machine readable program instructions and communicating with other computing devices (not shown) within distributed data processing environment 100 via a network, such as network 102. Client computing device(s) 104 represent one or more devices belonging to a user. Client computing device(s) 110 represent devices individually used by one or more users. Client computing device(s) 104 and client computing device(s) 110 each includes social network application 106. Client computing device(s) 104 also includes text-based application 108.

Social network application 106 is one or more of a plurality of platforms for building online social networks among people who share interests, activities, backgrounds, and/or real-life connections. Social network applications are web-based services that allow individuals to create a public or private profile, to create a list of users with whom to share connections, and to view and interact with the connections within the system. Social network applications may also include communication tools such as mobile connectivity, photo and video sharing, and blogging.

Text-based application 108 is one or more of a plurality of software applications that include text-based communication. For example, text-based application 108 may enable a user to write text, such as in a blog, a document, an image, an email, etc. In yet another example, text-based application 108 may enable a user to record text by either audio or video recording, or both. In the depicted embodiment, text-based application 108 resides on client computing device(s) 104. In another embodiment, text-based application 108 may reside elsewhere in distributed data processing environment 100 provided the user of client computing device(s) 104 can access text-based application 108 via network 102.

Server computer 112 can be a standalone computing device, a management server, a web server, a mobile computing device, or any other electronic device or computing system capable of receiving, sending, and processing data. In other embodiments, server computer 112 can represent a server computing system utilizing multiple computers as a server system, such as in a cloud computing environment. In another embodiment, server computer 112 can be a laptop computer, a tablet computer, a netbook computer, a personal computer (PC), a desktop computer, a personal digital assistant (PDA), a smart phone, or any programmable electronic device capable of communicating with client computing device(s) 104, client computing device(s) 110, and other computing devices (not shown) within distributed data processing environment 100 via network 102. In another embodiment, server computer 112 represents a computing system utilizing clustered computers and components (e.g., database server computers, application server computers, etc.) that act as a single pool of seamless resources when accessed within distributed data processing environment 100. Server computer 112 includes language detection program 114, indexing program 116, search index 118, and database 120. Server computer 112 may include internal and external hardware components, as depicted and described in further detail with respect to FIG. 4.

Language detection program 114 is one of a plurality of software programs known in the art for determining which natural language a given content is in. Language detection program 114 applies one or more statistical techniques to classify text. In one embodiment, language detection program 114 includes a confidence level with a result. In another embodiment, language detection program 114 can be run on various known inputs, and a determination made as to what length of input is sufficient for language detection program 114 to provide language detection with high confidence. In one embodiment, the confidence is a percentage measure of how strongly the language sample correlates with a matched language. As will be apparent to those of ordinary skill in the art, a plurality of statistical methods exist to determine the confidence level of that a language detected by language detection program 114 is the correct language.

Indexing program 116 determines the language of a conversation on a social network, such as social network application 106, for the purpose of indexing the conversation for search engine queries. Indexing program 116 first determines the language of content created by a user via text-based application 108. Indexing program 116 invokes language detection program 114 to determine the language of the content and combines that with language settings of the user's device, i.e., client computing device(s) 104 and the language settings of a user interface of text-based application 108. If indexing program 116 can determine the language of the content with a confidence level that exceeds a pre-defined threshold, then indexing program 116 determines the user's preferred language based on a combination of the settings and the detected language of the content. If indexing program 116 cannot determine the language of the content with a confidence level that exceeds a pre-defined threshold, then indexing program 116 determines the user's preferred language based on the settings. At the time the text of a conversation is indexed, indexing program 116 determines whether the language of the text is detected with high confidence. If not, then indexing program 116 looks back to previous conversations between the same users to determine the language of the conversation. If indexing program 116 does not determine the language of a previous conversation between the same users with high confidence, then indexing program 116 looks back to previous conversations held by two or more of the individual users to determine the language of the conversations. If there is still insufficient confidence in the detected language, then indexing program 116 retrieves the users' preferred languages, analyzes the text for each language, and stores the index terms with an associated boost value for each term which is based on the probability of each preferred language being the correct language for the text. Indexing program 116 is depicted and described in further detail with respect to FIG. 2 and FIG. 3.

Search index 118 is a repository for index terms and associated boost values created by indexing program 116. Search index 118 may use one or more of a plurality of storage methods, as will be recognized by one skilled in the art. Examples of index storage methods include, but are not limited to, a suffix tree, an inverted index, and an ngram index. Search index 118 can be implemented with any type of storage device capable of storing data and configuration files that can be accessed and utilized by server computer 112, such as a database server, a hard disk drive, or a flash memory.

In the depicted embodiment, database 120 resides on server computer 112. In another embodiment, database 120 may reside elsewhere within distributed data processing environment 100 provided indexing program 116 has access to database 120. A database is an organized collection of data. Database 120 can be implemented with any type of storage device capable of storing data and configuration files that can be accessed and utilized by server computer 112, such as a database server, a hard disk drive, or a flash memory. Database 120 stores users' preferred languages, as determined by indexing program 116. In addition, database 120 may store a plurality of confidence thresholds used by indexing program 116. Database 120 may also store the text from conversations held by users of client computing device(s) 104 and client computing device(s) 110, as well as one or more detected languages from each of the conversations and statistics for calculating the probability of the users using the detected language again for new text.

Figure 2:
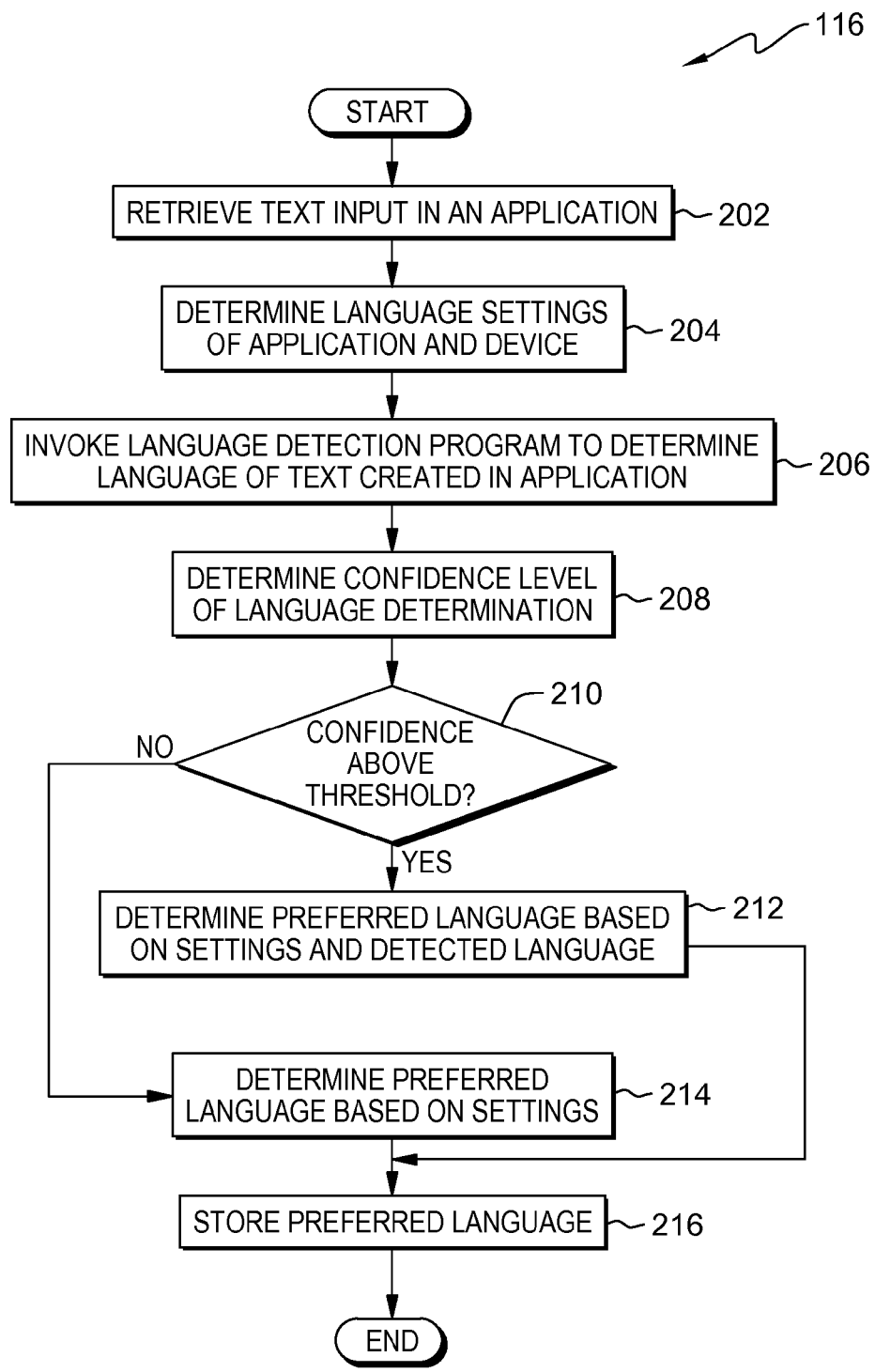
FIG. 2 is a flowchart depicting operational steps of an indexing program, on a server computer within the distributed data processing environment of FIG. 1, for determining a user's preferred language, in accordance with an embodiment of the present invention.

FIG. 2 is a flowchart depicting operational steps of indexing program 116, on server computer 112 within distributed data processing environment 100 of FIG. 1, for determining a user's preferred language, in accordance with an embodiment of the present invention.

Indexing program 116 retrieves text input in an application (step 202). Indexing program 116 retrieves the text created by the user of client computing device(s) 104, such as text input into social network application 106 or text-based application 108. In one embodiment, indexing program 116 retrieves the text continuously, as the user inputs to the application. In another embodiment, indexing program 116 retrieves text at a regular time interval. In a further embodiment, indexing program 116 may retrieve the text at the completion of the user's input or when the application is closed.

Indexing program 116 determines the language settings of the application and the device (step 204). Indexing program 116 collects explicit language settings from the user interface of the one or more applications in which the user creates text, such as social network application 106 or text-based application 108. In one embodiment, the explicit language settings of the user interfaces are a default value, set based on the location of client computing device(s) 104. In another embodiment, the user defines the explicit language settings. Indexing program 116 also collects explicit language settings on client computing device(s) 104 at the time the user creates text. In an embodiment, the explicit language settings on client computing device(s) 104 are a default value, set based on the location of client computing device(s) 104. In another embodiment, the user defines the explicit language settings. In one embodiment, indexing program 116 stores the collected settings in database 120.

Indexing program 116 invokes a language detection program to determine the language of the text created in the application (step 206). Indexing program 116 invokes language detection program 114 to detect the language of the text the user creates in the one or more applications, based on dictionaries and character sets. In one embodiment, indexing program 116 invokes language detection program 114 to analyze a plurality of text created by the user, whether in the present or the past, to detect the language of the text. In an embodiment, if language detection program 114 cannot detect a language, then indexing program 116 ends.

Indexing program 116 determines the confidence level of the language determination (step 208). Confidence level, or confidence, in a language prediction is a degree of reliability that can be imparted to the predicted language. For example, a language detection algorithm may predict that the language of a given text is English with a ten percent confidence. In other words, a ten percent confidence in a language prediction suggests that there is a ninety percent possibility that this language prediction is wrong. Indexing program 116 may determine one or more languages and apply a confidence level, or a score, to each language. In one embodiment, the confidence level is based on the quantity of text created in each language. In another embodiment, the confidence level is based on a degree of matching between the created text and the base form of the text, which may be stored in database 120. In a further embodiment, indexing program 116 may apply different weights to each language detected.

Indexing program 116 determines whether the confidence level is above a threshold (decision block 210). Indexing program 116 determines whether the probability that the language determined by language detection program 114 is the correct language is above a pre-defined threshold. In one embodiment, indexing program 116 determines whether the language is detected with a high confidence level based on the number of text entries available to analyze. For example, indexing program 116 may require a minimum of 100 samples in order to have a statistically significant sample size. In another embodiment, indexing program 116 determines whether the language is detected with a high confidence based on the quantity of terms available to analyze in each text entry. In another embodiment, indexing program 116 determines whether the language is detected with a high confidence based on either the number of text entries or terms received over a pre-defined period of time.

If indexing program 116 determines the confidence level is above the threshold ("yes" branch, decision block 210), then indexing program 116 determines the user's preferred language based on the settings and the detected language (step 212). Indexing program 116 combines the results of the determination of the language of the application and device settings with the determination of the language of the created text by language detection program 114 to determine a preferred language of the user. In an embodiment, if indexing program 116 determines the confidence level exceeds the pre-defined threshold for more than one language, then indexing program 116 determines more than one preferred language, and gives each preferred language a probability score that corresponds to the confidence level that the determined language is correct.

If indexing program 116 determines the confidence level is not above the threshold ("no" branch, decision block 210), then indexing program 116 determines the user's preferred language based on the settings (step 214). If the confidence level of the one or more languages determined by language detection program 114 does not exceed the pre-defined threshold, then indexing program 116 determines the user's preferred language based on the explicit language settings from the user interface of the one or more applications in which the user creates text, and on the explicit language settings on client computing device(s) 104.

Indexing program 116 stores the preferred language (step 216). Indexing program 116 stores the determined preferred language as the user's preferred language in database 120. In an embodiment, if indexing program 116 determines more than one preferred language, then indexing program 116 stores each of the languages as a preferred language in database 120. In one embodiment, indexing program 116 may assign a probability or a score to each of the languages to indicate the confidence level of each of the languages, and store the associated confidence level with the corresponding language.

Figure 3:
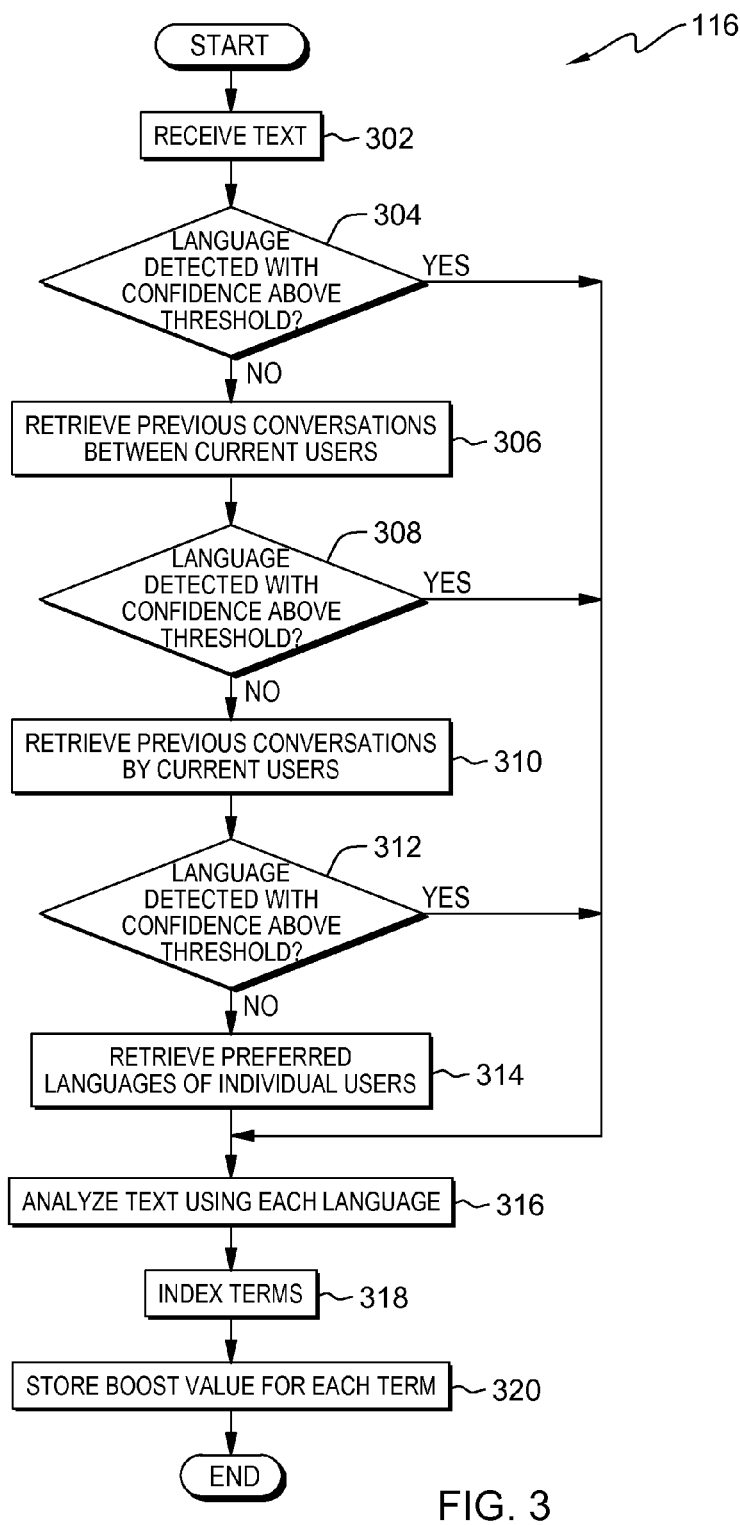
FIG. 3 is a flowchart depicting operational steps of the indexing program, on the server computer within the distributed data processing environment of FIG. 1, for multilingual indexing, in accordance with an embodiment of the present invention.

FIG. 3 is a flowchart depicting operational steps of indexing program 116, on server computer 112 within distributed data processing environment 100 of FIG. 1, for multilingual indexing, in accordance with an embodiment of the present invention.

Indexing program 116 receives text (step 302). As a user of client computing device(s) 104 engages in a conversation with one or more users of client computing device(s) 110, via social network application 106, indexing program 116 receives the text from the conversation for indexing such that the text can be retrieved by a search engine query in the future.

Indexing program 116 determines whether the language of the text is detected with a confidence level above a pre-defined threshold (decision block 304). Indexing program 116 determines the language of received text in order to correctly index the terms of the conversation. Indexing program 116 invokes language detection program 114 to analyze the received text and determine the language of the text. In one embodiment, language detection program 114 determines a confidence level, or probability, of the detected language being the correct language. In another embodiment, indexing program 116 receives the determined language from language detection program 114 and determines a confidence level.

If indexing program 116 determines the confidence level of the detected language is not above a pre-defined threshold ("no" branch, decision block 304), then indexing program 116 retrieves previous conversations that were held between the current users (step 306). Indexing program 116 retrieves the text from previous conversations held between two or more of the participants of the current conversation, i.e., the user of client computing device(s) 104 and one or more users of client computing device(s) 110, from database 120. In one embodiment, previous conversations between the users of the current conversation are preprocessed, i.e., indexed, and kept in a data structure that allows the keeping of statistics. For example, indexing program 116 may store statistics such as 80 percent of the time the current participants have a conversation, the conversation is in English while 20 percent of the time the conversation is in French.

Indexing program 116 determines whether the language of the text is detected with a confidence level above a pre-defined threshold (decision block 308). In one embodiment, indexing program 116 retrieves the stored statistics of the previous conversations from database 120 to determine if the language of the text was detected with a confidence level above the pre-defined threshold. In another embodiment, as discussed with respect to decision block 304, indexing program 116 invokes language detection program 114 to analyze the text of the retrieved previous conversations and determine the language of the text, and then indexing program 116 determines whether the language is detected with a confidence level over the pre-defined threshold.

If indexing program 116 determines the confidence level of the detected language is not above a pre-defined threshold ("no" branch, decision block 308), then indexing program 116 retrieves previous individual conversations that were held by the current users (step 310). If there was not sufficient confidence from conversations held between the participants of the current conversation to determine the detected language, then indexing program 116 proceeds to retrieve previous conversations by one or more of the participants of the current conversation which may not have been held with one or more participants of the current conversation. In one embodiment, indexing program 116 retrieves conversations from at least two of the current participants. In another embodiment, indexing program 116 retrieves conversations from each of the current participants if the conversations are available.

Indexing program 116 determines whether the language of the text is detected with a confidence level above a pre-defined threshold (decision block 312). As discussed with respect to decision block 308, in one embodiment, indexing program 116 retrieves the stored statistics of the previous conversations from database 120 to determine if the language of the text was detected with a confidence level above the pre-defined threshold. In another embodiment, indexing program 116 invokes language detection program 114 to analyze the text of the previous conversations and determine the language of the text, and then indexing program 116 determines whether the language is detected with a confidence level over the pre-defined threshold.

If indexing program 116 determines the confidence level of the detected language is not above a pre-defined threshold ("no" branch, decision block 312), then indexing program 116 retrieves one or more preferred languages of the individual users (step 314). As discussed with respect to FIG. 2, indexing program 116 stores one or more preferred languages of the users based on text created in social network application 106 and/or text-based application 108 in database 120. If indexing program 116 cannot determine the language of the received text with a high confidence based on previous conversations, then indexing program 116 retrieves a list of one or more languages associated with at least one user participating in the current conversation. In embodiments, a high confidence level is any confidence level over the pre-defined threshold. In one embodiment, the retrieved languages each have a score, based on a number of occurrences, with which indexing program 116 weights the probability of the language being the correct language. In one embodiment, indexing program 116 retrieves the top three languages for each user. In another embodiment, indexing program 116 retrieves one language for each user. In a further embodiment, indexing program 116 retrieves each language with a score above a pre-defined threshold.

Responsive to retrieving one or more preferred languages of the participants of the current conversation, or if indexing program 116 determines the confidence level of the detected language is above a pre-defined threshold ("yes" branch, decision blocks 304, 308, and 312), then indexing program 116 analyzes the received text using each language (step 316). In one embodiment, indexing program 116 analyzes the received text. In another embodiment, indexing program 116 invokes one or more of a plurality of appropriate analyzers for each language, as would be known in the art. Indexing program 116 separates the text, i.e., a piece of content, from the punctuation and spaces into words to get to the root of each term. Indexing program 116 analyzes the text to determine, for example, base forms of each term for each of the languages determined in the previous steps. For example, if the text includes the sentence "The boy ran around the block," the word "ran" is analyzed and the base form of "ran," i.e., "run" is the term that indexing program 116 indexes.

Indexing program 116 indexes terms (step 318). Based on the text analysis performed in step 316, indexing program 116 indexes each of the terms and stores them in search index 118. Indexing serves as a mapping from the terms to the original text. In one embodiment, indexing program 116 indexes the terms at a regular interval, for example, every ten minutes. In another embodiment, indexing program 116 may index the terms continuously, as text is received.

Indexing program 116 stores a boost value for each term (step 320). A boost value is a numerical representation of a confidence level or a probability of the language being the correct language. Indexing program 116 stores a boost value corresponding to each term for each language determined in the previous steps, where the boost value is equivalent to the previously determined confidence level that the language is correct. Indexing program 116 stores the boost value with the associated term in search index 118. During the time of a search query, the search algorithm factors in the boost values by multiplying them in the score of each query term.

Figure 4:
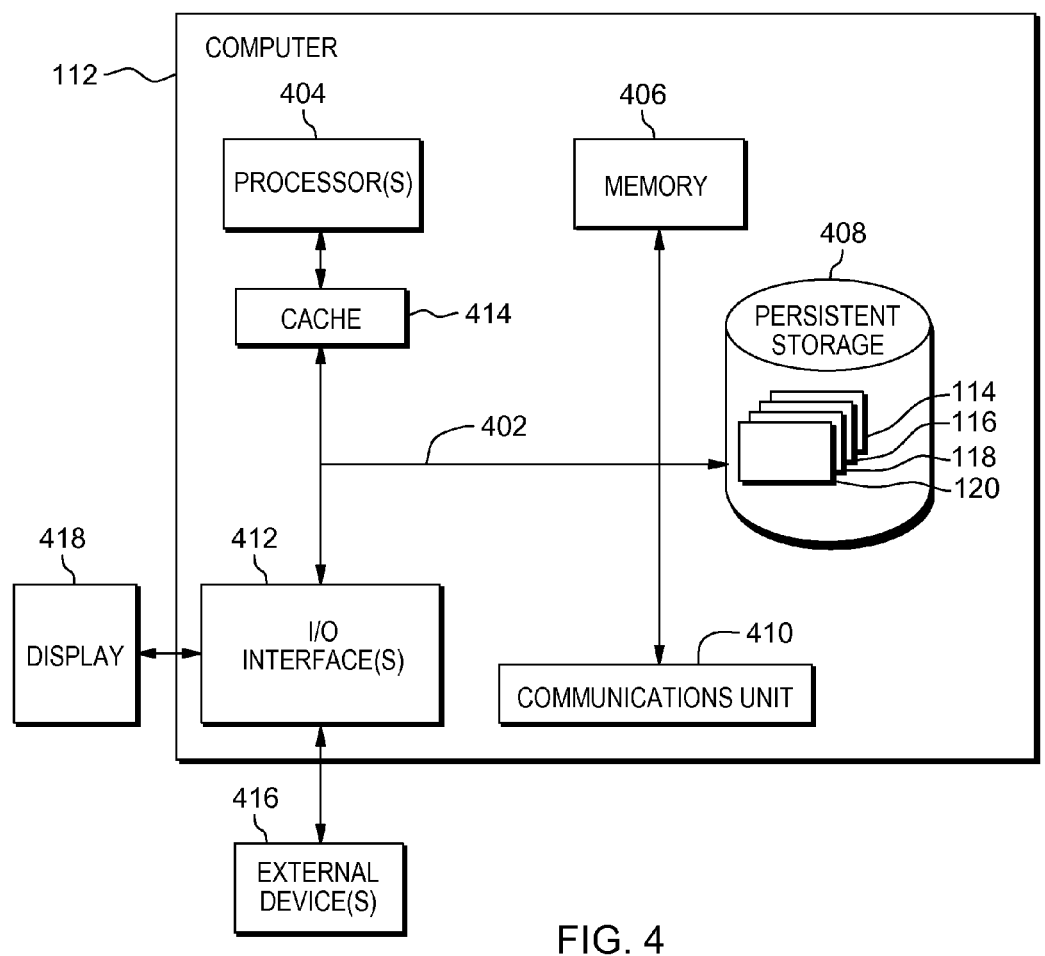
FIG. 4 depicts a block diagram of components of the server computer executing the indexing program within the distributed data processing environment of FIG. 1, in accordance with an embodiment of the present invention.

FIG. 4 depicts a block diagram of components of server computer 112 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 112 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., language detection program 114, indexing program 116, search index 118, and database 120 are stored in persistent storage 408 for execution and/or access by one or more of the respective processor(s) 404 of server computer 112 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device(s) 104 and client computing device(s) 110. In these examples, communications unit 410 includes one or more network interface cards. Communications unit 410 may provide communications through the use of either or both physical and wireless communications links. Language detection program 114, indexing program 116, search index 118, and database 120 may be downloaded to persistent storage 408 of server computer 112 through communications unit 410.

I/O interface(s) 412 allows for input and output of data with other devices that may be connected to server computer 112. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., language detection program 114, indexing program 116, search index 118, and database 120 on server computer 112, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for automating multilingual indexing, the method comprising:
   receiving, by one or more computer processors, text of a first conversation between a first user and at least one second user;
   detecting, by the one or more computer processors, at least one language associated with the text of the first conversation;
   determining, by the one or more computer processors, whether the at least one language associated with the text of the first conversation is detected with a first confidence level that exceeds a first pre-defined threshold;

responsive to determining the at least one language associated with the text of the first conversation is not detected with the first confidence level that exceeds the first pre-defined threshold, retrieving, by the one or more computer processors, text from one or more previous conversations between the first user and the at least one second user;

detecting, by the one or more computer processors, at least one language associated with the text of the one or more previous conversations between the first user and the at least one second user;

determining, by the one or more computer processors, whether the at least one language associated with the text of the one or more previous conversations between the first user and the at least one second user is detected with a second confidence level that exceeds a second pre-defined threshold;

responsive to determining the at least one language associated with the text of the one or more previous conversations between the first user and the at least one second user is detected with the second confidence level that exceeds the second pre-defined threshold, analyzing, by the one or more computer processors, the text of the first conversation using the at least one detected language associated with the text of the one or more previous conversations between the first user and the at least one second user to create one or more index terms, wherein index terms are included in the text of the first conversation;

indexing, by the one or more computer processors, the one or more index terms, wherein indexing serves as a mapping from the index terms to the text of the first conversation as automating multilingual indexing; and storing, by the one or more computer processors, the second confidence level of the at least one detected language associated with the text of the one or more previous conversations between the first user and the at least one second user associated with each of the one or more index terms.

2. The method of claim 1, further comprising:
responsive to determining the at least one language associated with the text of the one or more previous conversations between the first user and the at least one second user is not detected with the second confidence level that exceeds the second pre-defined threshold, retrieving, by the one or more computer processors, text from one or more previous conversations by at least one of the first user and the at least one second user;

detecting, by the one or more computer processors, at least one language associated with the text of the one or more previous conversations by at least one of the first user and the at least one second user; and determining, by the one or more computer processors, the at least one language associated with the text of the one or more previous conversations by at least one of the first user and the at least one second user is detected with a third confidence level that exceeds a third pre-defined threshold.

3. The method of claim 2, further comprising, responsive to determining the at least one language associated with the text of the one or more previous conversations by at least one of the first user and the at least one second user is not detected with the second confidence level that exceeds the second pre-defined threshold, retrieving, by the one or more computer processors, one or more preferred languages of the first user and the at least one second user.

4. The method of claim 3, wherein retrieving one or more preferred languages further comprises:
retrieving, by the one or more computer processors, text input in one or more applications by a user;
determining, by the one or more computer processors, at least one of: a language setting of the one or more applications, a language setting of the user's one or more devices that include the one or more applications, and a language of the text; and
determining, by the one or more computer processors, based, at least in part, on the at least one of the language setting of the one or more applications, the language setting of the one or more devices, and the language of the text, one or more preferred languages of the user.

5. The method of claim 4, further comprising:
determining, by the one or more computer processors, a third confidence level of the language of the text input in one or more applications by the user;
determining, by the one or more computer processors, whether the third confidence level exceeds a third pre-defined threshold;
responsive to determining the third confidence level exceeds the third pre-defined threshold, determining, by the one or more computer processors, based, at least in part, on the at least one of the language setting of the one or more applications, the language setting of the one or more devices, and the language of the text input in one or more applications by the user, one or more preferred languages of the user; and
storing, by the one or more computer processors, the one or more preferred languages.

6. The method of claim 5, further comprising, responsive to determining the third confidence level does not exceed the third pre-defined threshold, determining, by the one or more computer processors, based, at least in part, on the at least one of the language setting of the one or more applications and the language setting of the one or more devices, one or more preferred languages of the user.

7. The method of claim 5, wherein the third confidence level is based, at least in part, on at least one of: a quantity of text created in each language, and a degree of matching between the text input and a base form of the text input.

8. A computer program product for automating multilingual indexing, the computer program product comprising:
one or more computer readable storage device and program instructions stored on the one or more computer readable storage device and executed by one or more computer processors, the stored program instructions comprising:
program instructions to receive text of a first conversation between a first user and at least one second user;
program instructions to detect at least one language associated with the text of the first conversation;
program instructions to determine whether the at least one language associated with the text of the first conversation is detected with a first confidence level that exceeds a first pre-defined threshold;
responsive to determining the at least one language associated with the text of the first conversation is not detected with the first confidence level that exceeds the first pre-defined threshold, program instructions to retrieve text from one or more previous conversations between the first user and the at least one second user;

program instructions to detect at least one language associated with the text of the one or more previous conversations between the first user and the at least one second user;

program instructions to determine whether the at least one language associated with the text of the one or more previous conversations between the first user and the at least one second user is detected with a second confidence level that exceeds a second pre-defined threshold;

responsive to determining the at least one language associated with the text of the one or more previous conversations between the first user and the at least one second user is detected with the second confidence level that exceeds the second pre-defined threshold, program instructions to analyze the text of the first conversation using the at least one detected language associated with the text of the one or more previous conversations between the first user and the at least one second user to create one or more index terms, wherein index terms are included in the text of the first conversation;

program instructions to index the one or more index terms, wherein indexing serves as a mapping from the index terms to the text of the first conversation as automating multilingual indexing; and program instructions to store the second confidence level of the at least one detected language associated with the text of the one or more previous conversations between the first user and the at least one second user associated with each of the one or more index terms.

9. The computer program product of claim 8, the stored program instructions further comprising:

responsive to determining the at least one language associated with the text of the one or more previous conversations between the first user and the at least one second user is not detected with the second confidence level that exceeds the second pre-defined threshold, program instructions to retrieve text from one or more previous conversations by at least one of the first user and the at least one second user;

program instructions to detect at least one language associated with the text of the one or more previous conversations by at least one of the first user and the at least one second user; and program instructions to determine the at least one language associated with the text of the one or more previous conversations by at least one of the first user and the at least one second user is detected with a third confidence level that exceeds a third pre-defined threshold.

10. The computer program product of claim 9, the stored program instructions further comprising, responsive to determining the at least one language associated with the text of the one or more previous conversations by at least one of the first user and the at least one second user is not detected with the second confidence level that exceeds the second pre-defined threshold, program instructions to retrieve one or more preferred languages of the first user and the at least one second user.

11. The computer program product of claim 10, wherein the program instructions to retrieve one or more preferred languages comprise:

program instructions to retrieve text input in one or more applications by a user;

program instructions to determine at least one of: a language setting of the one or more applications, a language setting of the user's one or more devices that include the one or more applications, and a language of the text; and program instructions to determine, based, at least in part, on the at least one of the language setting of the one or more applications, the language setting of the one or more devices, and the language of the text, one or more preferred languages of the user.

12. The computer program product of claim 11, the stored program instructions further comprising:

program instructions to determine a third confidence level of the language of the text input in one or more applications by the user;

program instructions to determine whether the third confidence level exceeds a third pre-defined threshold;

responsive to determining the third confidence level exceeds the third pre-defined threshold, program instructions to determine, based, at least in part, on the at least one of the language setting of the one or more applications, the language setting of the one or more devices, and the language of the text input in one or more applications by the user, one or more preferred languages of the user; and program instructions to store the one or more preferred languages.

13. The computer program product of claim 12, the stored program instructions further comprising, responsive to determining the third confidence level does not exceed the third pre-defined threshold, program instructions to determine, based, at least in part, on the at least one of the language setting of the one or more applications and the language setting of the one or more devices, one or more preferred languages of the user.

14. The computer program product of claim 12, wherein the third confidence level is based, at least in part, on at least one of: a quantity of text created in each language, and a degree of matching between the text input and a base form of the text input.

15. A computer system for automating multilingual indexing, the computer system comprising:

one or more computer processors;

one or more computer readable storage device;

program instructions stored on the one or more computer readable storage device for execution by at least one of the one or more computer processors, the stored program instructions comprising:

program instructions to receive text of a first conversation between a first user and at least one second user;

program instructions to detect at least one language associated with the text of the first conversation;

program instructions to determine whether the at least one language associated with the text of the first conversation is detected with a first confidence level that exceeds a first pre-defined threshold;

responsive to determining the at least one language associated with the text of the first conversation is not detected with the first confidence level that exceeds the first pre-defined threshold, program instructions to retrieve text from one or more previous conversations between the first user and the at least one second user;

program instructions to detect at least one language associated with the text of the one or more previous conversations between the first user and the at least one second user;

program instructions to determine whether the at least one language associated with the text of the one or more previous conversations between the first user and the at least one second user is detected with a second confidence level that exceeds a second pre-defined threshold;

responsive to determining the at least one language associated with the text of the one or more previous conversations between the first user and the at least one second user is detected with the second confidence level that exceeds the second pre-defined threshold, program instructions to analyze the text of the first conversation using the at least one detected language associated with the text of the one or more previous conversations between the first user and the at least one second user to create one or more index terms, wherein index terms are included in the text of the first conversation;

program instructions to index the one or more index terms, wherein indexing serves as a mapping from the index terms to the text of the first conversation as automating multilingual indexing; and program instructions to store the second confidence level of the at least one detected language associated with the text of the one or more previous conversations between the first user and the at least one second user associated with each of the one or more index terms.

16. The computer system of claim 15, the stored program instructions further comprising:

responsive to determining the at least one language associated with the text of the one or more previous conversations between the first user and the at least one second user is not detected with the second confidence level that exceeds the second pre-defined threshold, program instructions to retrieve text from one or more previous conversations by at least one of the first user and the at least one second user;

program instructions to detect at least one language associated with the text of the one or more previous conversations by at least one of the first user and the at least one second user; and program instructions to determine the at least one language associated with the text of the one or more previous conversations by at least one of the first user and the at least one second user is detected with a third confidence level that exceeds a third pre-defined threshold.

17. The computer program product of claim 9, the stored program instructions further comprising, responsive to determining the at least one language associated with the text of the one or more previous conversations by at least one of the first user and the at least one second user is not detected with the second confidence level that exceeds the second pre-defined threshold, program instructions to retrieve one or more preferred languages of the first user and the at least one second user.

18. The computer system of claim 17, wherein the program instructions to retrieve one or more preferred languages comprise:

program instructions to retrieve text input in one or more applications by a user;

program instructions to determine at least one of: a language setting of the one or more applications, a language setting of the user's one or more devices that include the one or more applications, and a language of the text; and program instructions to determine, based, at least in part, on the at least one of the language setting of the one or more applications, the language setting of the one or more devices, and the language of the text, one or more preferred languages of the user.

19. The computer system of claim 18, the stored program instructions further comprising:

program instructions to determine a third confidence level of the language of the text input in one or more applications by the user;

program instructions to determine whether the third confidence level exceeds a third pre-defined threshold;

responsive to determining the third confidence level exceeds the third pre-defined threshold, program instructions to determine, based, at least in part, on the at least one of the language setting of the one or more applications, the language setting of the one or more devices, and the language of the text input in one or more applications by the user, one or more preferred languages of the user; and program instructions to store the one or more preferred languages.

20. The computer program product of claim 12, the stored program instructions further comprising, responsive to determining the third confidence level does not exceed the third pre-defined threshold, program instructions to determine, based, at least in part, on the at least one of the language setting of the one or more applications and the language setting of the one or more devices, one or more preferred languages of the user.

* * * * *